United States Patent
Murata et al.

(10) Patent No.: US 8,001,953 B2
(45) Date of Patent: Aug. 23, 2011

(54) EXHAUST GAS RECIRCULATION SYSTEM FOR INTERNAL COMBUSTION ENGINE AND METHOD FOR CONTROLLING THE SAME

(75) Inventors: Hiroki Murata, Gotenba (JP);
Masahiro Nagae, Niskikamo-gun (JP);
Hajime Shimizu, Susono (JP); Shigeki Nakayama, Susono (JP); Tomomi Onishi, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 202 days.

(21) Appl. No.: 12/522,631

(22) PCT Filed: Jan. 11, 2008

(86) PCT No.: PCT/IB2008/000046
§ 371 (c)(1),
(2), (4) Date: Jul. 9, 2009

(87) PCT Pub. No.: WO2008/087515
PCT Pub. Date: Jul. 24, 2008

(65) Prior Publication Data
US 2010/0050999 A1    Mar. 4, 2010

(30) Foreign Application Priority Data
Jan. 18, 2007 (JP) ................. 2007-009422

(51) Int. Cl.
*F02B 47/08* (2006.01)

(52) U.S. Cl. ............. 123/568.21; 123/559.1
(58) Field of Classification Search ......... 123/568.11, 123/568.14, 568.21, 559.1; 60/605.2
See application file for complete search history.

(56) References Cited

U.S. PATENT DOCUMENTS

| | | | |
|---|---|---|---|
| 2009/0223221 A1* | 9/2009 | Onishi et al. | 60/603 |
| 2009/0283077 A1* | 11/2009 | Murata et al. | 123/568.16 |
| 2010/0000500 A1* | 1/2010 | Shimizu et al. | 123/568.21 |

FOREIGN PATENT DOCUMENTS

| | | |
|---|---|---|
| EP | 1 870 584 A2 | 12/2007 |
| EP | 1 892 400 A2 | 2/2008 |
| JP | 2002-021625 A | 1/2002 |
| JP | 2004-150319 A | 5/2004 |
| JP | 2005-076456 A | 3/2005 |
| JP | 2006-336547 A | 12/2006 |
| WO | 2007/085944 A1 | 8/2007 |
| WO | 2008/038083 A2 | 4/2008 |

* cited by examiner

*Primary Examiner* — Hai H Huynh
(74) *Attorney, Agent, or Firm* — Sughrue Mion, PLLC

(57) ABSTRACT

In an exhaust gas recirculation system for an internal combustion engine, which includes a turbocharger; a high-pressure EGR unit; a low-pressure EGR unit; a high-pressure EGR valve; and a low-pressure EGR valve, first, the opening amount of the high-pressure EGR valve is controlled in a feedback manner, and, then, the opening amount of a low-pressure EGR valve is controlled in a feedback manner in a transitional operation period in which the operation mode of the internal combustion engine is changing. In this way, the intake air amount is promptly adjusted to the target intake air amount without causing hunting.

14 Claims, 3 Drawing Sheets

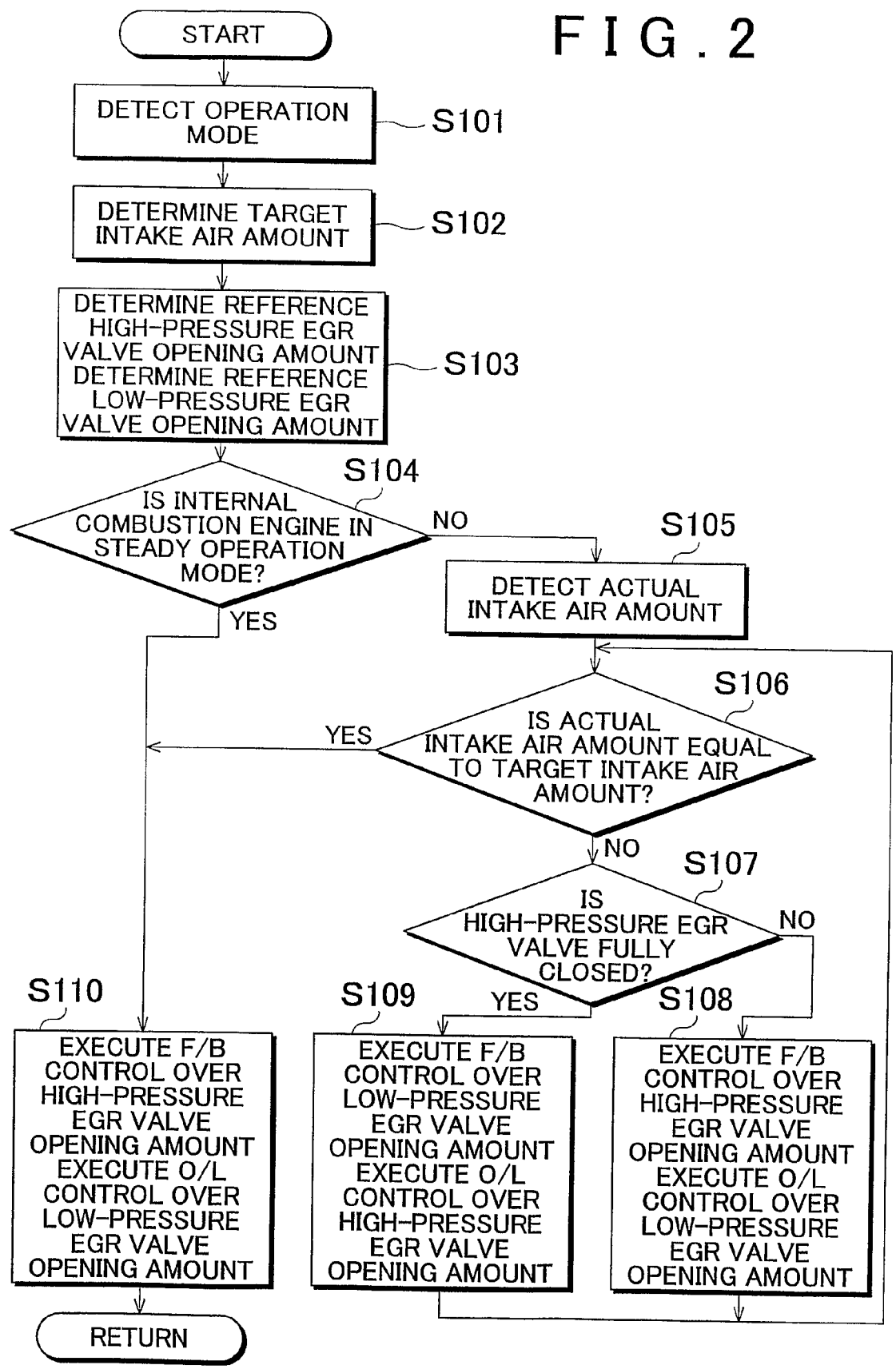

FUEL INJECTION AMOUNT

HIGH-PRESSURE EGR VALVE OPENING AMOUNT

HIGH-PRESSURE EGR GAS AMOUNT

LOW-PRESSURE EGR VALVE OPENING AMOUNT

LOW-PRESSURE EGR GAS AMOUNT

INTAKE AIR AMOUNT

AMOUNT OF GENERATED SMOKE

EXHAUST GAS RECIRCULATION SYSTEM FOR INTERNAL COMBUSTION ENGINE AND METHOD FOR CONTROLLING THE SAME

BACKGROUND OF THE INVENTION

1. Field of the Invention

The invention relates to an exhaust gas recirculation system for an internal combustion engine, and a method for controlling the same.

2. Description of the Related Art

An exhaust gas recirculation (EGR) system that recirculates a portion of the exhaust gas back to an intake system of an internal combustion engine has been suggested in order to reduce the amount of nitrogen oxide (NOx) generated in the process of burning fuel in the internal combustion engine.

A technology that makes it possible to perform EGR in a broader operating range of an internal combustion engine is described in, for example, Japanese Patent Application Publication No. 2004-150319 (JP-A-2004-150319). According to this technology, a high-pressure EGR unit and a low-pressure EGR unit are provided, and EGR is performed while the EGR unit used for EGR is changed between the high-pressure EGR unit and the low-pressure EGR unit or both the high-pressure EGR unit and the low-pressure EGR unit are used in combination, based on the operation mode of the internal combustion engine. The high-pressure EGR unit recirculates a portion of the exhaust gas back to the internal combustion engine through a high-pressure EGR passage that provides communication between an exhaust passage, at a portion upstream of a turbine of a turbocharger, and an intake passage, at a portion downstream of a compressor of the turbocharger. The low-pressure EGR unit recirculates a portion of the exhaust gas back to the internal combustion engine through a low-pressure EGR passage that provides communication between the exhaust passage, at a portion downstream of the turbine, and the intake passage, at a portion upstream of the compressor. Other related technologies are described in, for example, Japanese Patent Application Publication No. 2002-21625 (JP-A-2002-21625) and Japanese Patent Application Publication No. 2005-76456 (JP-A-2005-76456).

In the EGR system that performs EGR using the high-pressure EGR unit and the low-pressure EGR unit in combination, the amount of EGR gas recirculated back to the internal combustion engine is controlled by adjusting the opening amount of a high-pressure EGR valve, which regulates the flow rate of high-pressure EGR gas flowing through the high-pressure EGR passage, and the opening amount of the low-pressure EGR valve, which regulates the flow rate of low-pressure EGR gas flowing through the low-pressure EGR passage.

Usually, a specified value of the high-pressure EGR valve and a specified value of the low-pressure EGR valve are set in such a manner that the amount of EGR gas recirculated back to the internal combustion engine is decreased as the fuel injection amount is increased in accordance with a change in the operation mode of the internal combustion engine to an operation mode in which a higher load is applied to the internal combustion engine. However, if the opening amount of the high-pressure EGR valve and the opening amount of the low-pressure EGR valve are adjusted to the specified values (i.e., the open-loop control is executed) in the engine speed-up transitional operation period in which the operation mode of the internal combustion engine is changing to the operation mode in which a higher load is applied to the internal combustion engine, the amount of EGR gas that is recirculated back to the internal combustion engine may be excessive. This may occur mainly because the low-pressure EGR gas amount does not change promptly in response to the control over the low-pressure EGR valve opening amount. As a result, a balance between the amount of air taken in the internal combustion engine and the fuel injection amount is not appropriately maintained, resulting in an increase in the amount of smoke.

The above-described inconvenience occurs due to the following reason. The amount of low-pressure EGR gas that is present in the flow path from the low-pressure EGR valve to cylinders of the internal combustion engine is relatively large, because the low-pressure EGR passage is long. Accordingly, even when the opening amount of the low-pressure EGR valve is changed, the amount of low-pressure EGR gas that is actually taken in the cylinders does not match the low-pressure EGR gas amount corresponding to the changed opening amount of the low-pressure EGR valve until the above-described residual low-pressure EGR gas is entirely taken in the cylinders.

In the engine speed-up transitional operation period in which the operation mode of the internal combustion engine is changing, the high-pressure EGR valve opening amount and the low-pressure EGR valve opening amount may be controlled in a feedback manner. However, in this case as well, the high-pressure EGR gas amount is appropriately controlled because it changes promptly in response to a change in the opening amount of the high-pressure EGR valve, whereas the low-pressure EGR gas amount does not change promptly in response to a change in the opening amount of the low-pressure EGR valve. Therefore, hunting occurs in the control over the amount of EGR gas recirculated back to the internal combustion engine that is, in the amount of air taken in the internal combustion engine, resulting in an increase in the amount of smoke and deterioration in the drivability. Such an inconvenience occurs because the speed of response to the control greatly differs between the two parameters which are controlled in a feedback manner at the same time.

SUMMARY OF THE INVENTION

The invention provides a technology for appropriately controlling the amount of exhaust gas recirculated back to an internal combustion engine, that is, the amount of air taken in the internal combustion engine, even in the transitional operation period in which the operation mode of the internal combustion engine is changing, in an exhaust gas recirculation system that performs EGR using a high-pressure EGR unit and a low-pressure EGR unit in combination and a method for controlling the same.

A first aspect of the invention relates to an exhaust gas recirculation system for an internal combustion engine, which includes: a turbocharger that includes a compressor arranged in an intake passage of the internal combustion engine, and a turbine arranged in an exhaust passage of the internal combustion engine; a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a high-pressure EGR valve that is provided in the high-pressure EGR passage, and that changes a flow passage area of the high-pressure EGR passage; a low-pressure EGR valve that is provided in the low-pressure EGR passage, and that changes a flow passage area of the low-pressure EGR passage; and an EGR control unit that controls the amount of exhaust gas recirculated back to the internal combustion engine by adjusting the opening amount of the high-pressure EGR valve to a reference high-pressure EGR valve opening amount determined in advance based on the operation mode of the internal combustion engine and adjusting the opening amount of the low-pressure EGR valve to a reference low-pressure EGR valve opening amount determined in advance based on the operation mode of the internal combustion engine during a steady operation of the internal combustion engine.

The "reference high-pressure EGR valve opening amount" is a specified value of the opening amount of the high-pressure EGR valve, which is determined in advance based on the operation mode of the internal combustion engine. When the opening amount of the high-pressure EGR valve matches the reference high-pressure EGR valve opening amount, the high-pressure EGR gas amount during the steady operation of the internal combustion engine matches a predetermined reference high-pressure EGR gas amount. The "reference low-pressure EGR valve opening amount" is a specified value of the opening amount of the low-pressure EGR valve, which is determined in advance based on the operation mode of the internal combustion engine. When the opening amount of the low-pressure EGR valve matches the reference low-pressure EGR valve opening amount, the low-pressure EGR gas amount during the steady operation of the internal combustion engine matches a predetermined reference low-pressure EGR gas amount.

The "reference high-pressure EGR gas amount" and the "reference low-pressure EGR gas amount" are a specified value of the high-pressure EGR gas amount and a specified value of the low-pressure EGR gas amount, respectively, which are determined in advance. When the high-pressure EGR gas amount and the low-pressure EGR gas amount match the reference high-pressure EGR gas amount and the reference low-pressure EGR gas amount, respectively, the engine characteristics such as the exhaust gas properties and the fuel efficiency characteristics are optimized.

The high-pressure EGR gas amount is adjusted to the reference high-pressure EGR gas amount by adjusting the opening amount of the high-pressure EGR valve to the reference high-pressure EGR valve opening amount during the steady operation of the internal combustion engine. Also, the low-pressure EGR gas amount is adjusted to the reference low-pressure EGR gas amount by adjusting the opening amount of the low-pressure EGR valve to the reference low-pressure EGR valve opening amount during the steady operation of the internal combustion engine. Thus, it is possible to perform the steady operation of the internal combustion engine under the condition where the above-described various engine characteristics are optimized.

In the exhaust gas recirculation system according to the first aspect of the invention, in the transitional operation period in which the operation mode of the internal combustion engine is changing, the EGR control unit first controls the opening amount of the high-pressure EGR valve, and then controls the opening amount of the low-pressure EGR valve in a feedback manner after a predetermined condition is satisfied, so that the amount of air taken in the internal combustion engine matches a predetermined target intake air amount.

The "transitional operation period in which the operation mode of the internal combustion engine is changing" includes the engine speed-up transitional operation period in which the operation mode of the internal combustion engine is changing from an operation mode to another operation mode in which a load higher than that in the operation mode is applied to the internal combustion engine, and the engine speed-down transitional operation period in which the operation mode of the internal combustion engine is changing from an operation mode to another operation mode in which a load lower than that in the operation mode is applied to the internal combustion engine.

The "target intake air amount" is a target value of the intake air amount that is determined in advance based on the operation mode of the internal combustion engine. When the intake air amount matches the target intake air amount, the injected fuel is appropriately burned, and therefore incomplete combustion such as a misfire does not occur and smoke is not generated.

The "predetermined condition" is a condition under which it is determined that it is difficult to adjust the intake air amount to substantially the target intake air amount by controlling the opening amount of the high-pressure EGR valve.

In the engine speed-up transitional operation period, the target intake air amount increases as the fuel injection amount increases with an increase in a load applied to the internal combustion engine. Accordingly, the control for decreasing the amount of EGR gas recirculated back to the internal combustion engine is executed.

According to the first aspect of the invention, first, the opening amount of the high-pressure EGR valve is decreased, and then the opening amount of the low-pressure EGR valve is decreased after the predetermined condition is satisfied.

The predetermined condition is satisfied, for example, when the intake air amount has not reached the target intake air amount although the high-pressure EGR valve is fully closed. This is because it is not possible to further control the intake air amount by controlling the opening amount of the high-pressure EGR valve.

The predetermined condition may be satisfied when the rate of decrease in the opening amount of the high-pressure EGR valve exceeds a predetermined upper limit value. This condition is set on the assumption that the opening amount of the high-pressure EGR valve is abruptly decreased when a load applied to the internal combustion engine is abruptly increased and the difference between the actual intake air amount and the target intake air amount is considerably large in the early stage of the engine speed-up transitional operation period. In this case as well, it is determined that adjusting the intake air amount to the target intake air amount only by decreasing the opening amount of the high-pressure EGR valve is difficult. Therefore, the above-described condition is satisfied.

The predetermined condition may be satisfied when the opening amount of the high-pressure EGR valve is within a predetermined dead region. The "dead region" is a range of the high-pressure EGR valve opening amount, in which even when the high-pressure EGR valve opening amount is changed, the high-pressure EGR gas amount is unlikely to change by a desired amount. When the opening amount of the high-pressure EGR valve is within the dead region, the amount of high-pressure EGR gas does not change in an appropriate manner even when the opening amount of the high-pressure EGR valve is changed. Therefore, it is determined that it is not possible to further control the intake air amount only by decreasing the opening amount of the high-pressure EGR valve. Accordingly, the predetermined condition is satisfied.

According to the first aspect of the invention, first, the high-pressure EGR valve is controlled. Because the high-pressure EGR gas amount changes promptly in response to a change in the opening amount of the high-pressure EGR valve, the actual intake air amount promptly approaches the target intake air amount in the engine speed-up transitional operation period. Therefore, it is possible to appropriately suppress generation of smoke in the engine speed-up transitional operation period. In addition, the exhaust gas used to drive the turbine of the turbocharger is increased, because the high-pressure EGR gas amount is first decreased. Therefore, it is possible to promptly increase the efficiency of supercharging when the engine speed is increased.

In the engine speed-down transitional operation period, the intake air amount needs to be decreased promptly in response to a decrease in the engine load and a request to decrease the engine speed. According to the first aspect of the invention, first, the opening amount of the high-pressure EGR valve is increased in this case as well. Therefore, the high-pressure EGR gas amount is promptly increased, and the intake air amount is promptly decreased. In addition, the amount of exhaust gas, which is used to rotate the turbine and which is a portion of the exhaust gas discharged from the internal combustion engine, is promptly decreased by an amount corresponding to the high-pressure EGR gas amount. Therefore, the efficiency of supercharging is promptly decreased. As a result, it is possible to more appropriately adjust the intake air amount to the target intake air amount.

In the engine speed-down transitional operation period as well as in the engine speed-up transitional operation period, the control may be changed from the control over the high-pressure EGR valve opening amount to the control over the low-pressure EGR valve opening amount, for example, when the intake air amount does not match the target intake air amount although the high-pressure EGR valve is fully opened, when the rate of increase in the high-pressure EGR valve opening amount exceeds a predetermined upper limit value, or when the high-pressure EGR valve opening amount is within the dead region.

In the first aspect of the invention, in the transitional operation period, the EGR control unit may first control the opening amount of the high-pressure EGR valve in a feedback manner and the opening amount of the low-pressure EGR valve in an open-loop manner, and then control the opening amount of the low-pressure EGR valve in a feedback manner after the predetermined condition is satisfied, so that the amount of air taken in the internal combustion engine matches the target intake air amount.

Thus, in the early stage of the transitional operation period, the intake air amount is more promptly adjusted to substantially the target intake air amount by controlling the high-pressure EGR valve opening amount in a feedback manner. Also, the two parameters, namely, the high-pressure EGR valve opening amount and the low-pressure EGR valve opening amount are not controlled in a feedback manner at the same time. The high-pressure EGR gas amount changes promptly in response to a change in the high-pressure EGR valve opening amount, whereas the low-pressure EGR gas amount does not change promptly in response to a change in the low-pressure EGR valve opening amount. As a result, occurrence of hunting in the control over the intake air amount is suppressed.

The high-pressure EGR valve opening amount may be controlled in either a feedback manner or an open-loop manner during the feedback control over the low-pressure EGR valve after the predetermined condition is satisfied. After the predetermined condition is satisfied, the high-pressure EGR valve opening amount is zero (or substantially equal to zero), the maximum value (or substantially equal to the maximum value), or a value within the dead region. Therefore, even when the feedback control over the high-pressure EGR valve opening amount is executed, there is a low possibility that hunting will occur in the intake air amount.

In the first aspect of the invention, when the intake air amount matches the target intake air amount during the feedback control over the low-pressure EGR valve opening amount, the control over the low-pressure EGR valve opening amount may be shifted from the feedback control to the open-loop control, and the feedback control over the high-pressure EGR valve opening amount may be started.

Thus, in the exhaust gas recirculation system according to the first aspect of the invention, basically, the intake air amount is adjusted to the target intake air amount by controlling the high-pressure EGR valve opening amount in a feedback manner. During the feedback control of the high-pressure EGR valve opening amount, a change in the low-pressure EGR valve opening amount is suppressed (namely, the low-pressure EGR valve opening amount is controlled in an open-loop manner). Accordingly, even in the transitional operation period in which the operation mode of the internal combustion engine is changing, it is possible to promptly adjust the intake air amount to substantially the target intake air amount while suppressing occurrence of hunting due to execution of the feedback control.

A second aspect of the invention relates to a method for controlling an exhaust gas recirculation system for an internal combustion engine. The exhaust gas recirculation system includes: a turbocharger that includes a compressor arranged in an intake passage of the internal combustion engine, and a turbine arranged in an exhaust passage of the internal combustion engine; a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a high-pressure EGR valve that is provided in the high-pressure EGR passage, and that changes a flow passage area of the high-pressure EGR passage; and a low-pressure EGR valve that is provided in the low-pressure EGR passage, and that changes a flow passage area of the low-pressure EGR passage. According to the method, the amount of exhaust gas, which is recirculated back to the internal combustion engine, is controlled by adjusting the opening amount of the high-pressure EGR valve to a reference high-pressure EGR valve opening amount determined in advance based on the operation mode of the internal combustion engine and adjusting the opening amount of the low-pressure EGR valve to a reference low-pressure EGR valve opening amount determined in advance based on the operation mode of the internal combustion engine during a steady operation of the internal combustion engine. First, the opening amount of the high-pressure EGR valve is controlled, and then the opening amount of the low-pressure EGR valve is controlled after a predetermined condition is satisfied, so that the amount of air taken in the internal combustion engine matches a predetermined target intake air amount in the transitional operation period in which the operation mode of the internal combustion engine is changing.

According to the above-described aspects of the invention, it is possible to provide a technology for appropriately controlling the amount of exhaust gas recirculated back to the internal combustion engine, that is, the amount of air taken in the internal combustion engine, even in the transitional operation period in which the operation mode of the internal combustion engine is changing, in the exhaust gas recirculation system that performs EGR using the high-pressure EGR unit and the low-pressure EGR unit in combination, and the method for controlling the same. As a result, it is possible to suppress an increase in the amount of smoke and deterioration in the drivability in the transitional operation period.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIG. 2 is a flowchart showing the EGR control routine according to the embodiment of the invention.

DETAILED DESCRIPTION OF THE EMBODIMENT

Hereafter, an example embodiment of the invention will be described in detail with reference to the accompanying drawings. Unless otherwise noted, the sizes, materials, shapes, relative arrangements, etc. of the components described in the embodiment do not limit the technical scope of the invention.

Figure 1:
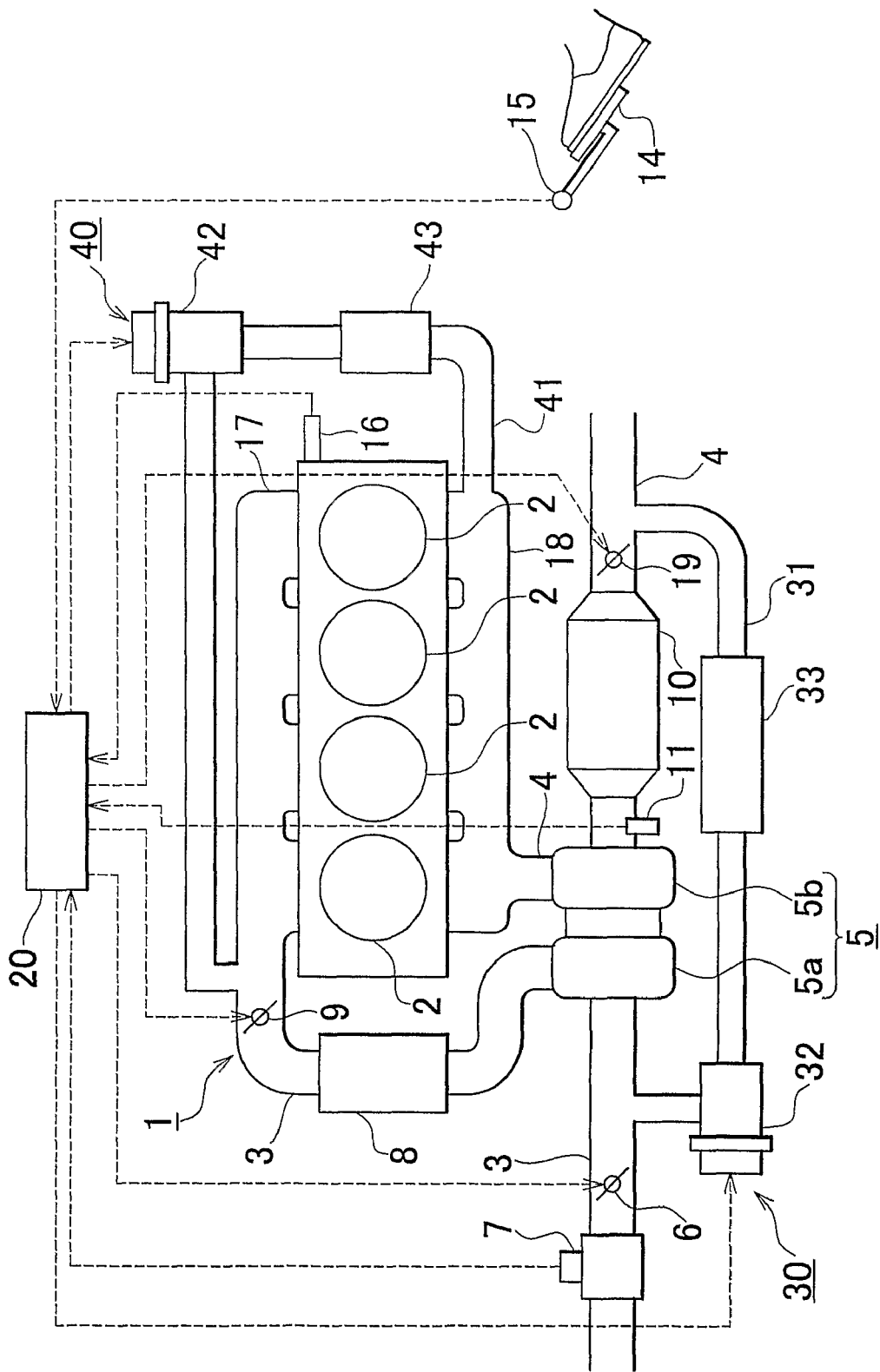
FIG. 1 is a view schematically showing the structure of an intake system, an exhaust system and a control system of an internal combustion engine according to an embodiment of the invention.

FIG. 1 is a view schematically showing the structure of an intake system, an exhaust system, and a control system of an internal combustion engine provided with an exhaust gas recirculation system for an internal combustion engine according to the embodiment of the invention. An internal combustion engine 1 shown in FIG. 1 is a water-cooled four-cycle diesel engine having four cylinders 2.

An intake manifold 17 and an exhaust manifold 18 are connected to the cylinders 2 of the internal combustion engine 1. An intake pipe 3 is connected to the intake manifold 17. A second intake throttle valve 9, which regulates the flow rate of the intake air flowing through the intake pipe 3, is provided in the intake pipe 3, at a position near the connection portion at which the intake manifold 17 and the intake pipe 3 are connected to each other. The second intake throttle valve 9 is opened/closed by an electric actuator. An intercooler 8, which cools the intake air by exchanging heat between the intake air and the outside air, is provided in the intake pipe 3, at a position upstream of the second intake throttle valve 9. A compressor housing 5a of a turbocharger 5 that operates using the energy of the exhaust gas as a driving source is provided in the intake pipe 3, at a position upstream of the intercooler 8. A first intake throttle valve 6, which regulates the flow rate of the intake air flowing through the intake pipe 3, is provided in the intake pipe 3, at a position upstream of the compressor housing 5a. The first intake throttle valve 6 is opened/closed by an electric actuator.

An exhaust pipe 4 is connected to the exhaust manifold 18. A turbine housing 5b of the turbocharger 5 is provided in a middle portion of the exhaust pipe 4. An exhaust gas control apparatus 10 is provided in the exhaust pipe 4, at a position downstream of the turbine housing 5b. The exhaust gas control apparatus 10 includes an oxidation catalyst and a particulate filter (hereinafter, referred to as a "filter") that is provided at a position downstream of the oxidation catalyst. The filter supports a NOx storage reduction catalyst (hereinafter, referred to as a "NOx catalyst"). An exhaust throttle valve 19, which regulates the flow rate of the exhaust gas flowing through the exhaust pipe 4, is provided in the exhaust pipe 4, at a position downstream of the exhaust gas control apparatus 10. The exhaust throttle valve 19 is opened/closed by an electric actuator. In the embodiment of the invention, the exhaust throttle valve 19 is provided in the exhaust pipe 4, at a position immediately downstream of the exhaust gas control apparatus 10. Alternatively, the exhaust gas throttle valve 19 may be provided in the exhaust pipe 4, at a position downstream of the connection portion at which a low-pressure EGR passage 31, which will be described later in detail, is connected to the exhaust pipe 4.

The internal combustion engine 1 is provided with a low-pressure EGR unit 30 that introduces a portion of the exhaust gas, flowing through the exhaust pipe 4, to the intake pipe 3, at low pressure, to recirculate it back to the cylinders 2. The low-pressure EGR unit 30 includes the low-pressure EGR passage 31, a low-pressure EGR valve 32 and a low-pressure EGR cooler 33.

The low-pressure EGR passage 31 provides communication between the exhaust pipe 4, at a portion downstream of the exhaust throttle valve 19, and the intake pipe 3, at a portion upstream of the compressor housing 5a and downstream of the first intake throttle valve 6. The exhaust gas is introduced to the intake pipe 3, at low pressure, through the low-pressure EGR passage 31. In the following description concerning the embodiment of the invention, the exhaust gas that is recirculated back to the cylinders 2 through the low-pressure EGR passage 31 will be referred to as the "low-pressure EGR gas".

The low-pressure EGR valve 32 is a flow-rate regulating valve that regulates the flow rate of the exhaust gas flowing through the low-pressure EGR passage 31 by changing the flow passage area of the low-pressure EGR passage 31. The flow rate of the low-pressure EGR gas is regulated by adjusting the opening amount of the low-pressure EGR valve 32 (hereinafter, referred to as the "low-pressure EGR valve opening amount"). The flow rate of the low-pressure EGR gas may be regulated by a method other than adjustment of the low-pressure EGR valve opening amount. For example, the flow rate of the low-pressure EGR gas may be regulated in a method in which the pressure difference between the upstream side and the downstream side of the low-pressure EGR passage 31 is changed by adjusting the opening amount of the first intake throttle valve 6.

The low-pressure EGR cooler 33 promotes heat exchange between the low-pressure EGR gas flowing through the low-pressure EGR cooler 33 and the coolant that cools the internal combustion engine 1 to cool the low-pressure EGR gas.

The internal combustion engine 1 is provided with a high-pressure EGR unit 40 that introduces a portion of the exhaust gas flowing through the exhaust pipe 4 to the intake pipe 3, at high pressure, to recirculate it back to the cylinders 2. The high-pressure EGR unit 40 includes a high-pressure EGR passage 41, a high-pressure EGR valve 42, and a high-pressure EGR cooler 43.

The high-pressure EGR passage 41 provides communication between the exhaust manifold 18 and the intake manifold 17. The exhaust gas is introduced to the intake pipe 3, at high pressure, through the high-pressure EGR passage 41. In the following description concerning the embodiment of the invention, the exhaust gas that is recirculated back to the cylinders 2 through the high-pressure EGR passage 41 will be referred to as the "high-pressure EGR gas".

The high-pressure EGR valve 42 is a flow-rate regulating valve that regulates the flow rate of the exhaust gas flowing through the high-pressure EGR passage 41 by changing the flow passage area of the high-pressure EGR passage 41. The flow rate of the high-pressure EGR gas is regulated by adjusting the opening amount of high-pressure EGR valve 42 (hereinafter, referred to as the "high-pressure EGR valve opening amount"). The flow rate of the high-pressure EGR gas may be regulated by a method other than adjustment of the high-pressure EGR valve opening amount. For example, the flow rate of the high-pressure EGR gas may be regulated in a method in which the pressure difference between the upstream side and the downstream side of the high-pressure EGR passage 41 is changed by adjusting the opening amount of the second intake throttle valve 9. When a variable capacity turbocharger is used as the turbocharger 5, the flow rate of the high-pressure EGR gas may be regulated by adjusting the opening amount of a nozzle vane that changes the flow characteristics of the exhaust gas that flows into the turbine.

The high-pressure EGR cooler 43 cools the high-pressure EGR gas by exchanging heat between the high-pressure EGR gas that flows through the high-pressure EGR cooler 43 and the coolant that cools the internal combustion engine 1.

The internal combustion engine 1 is provided with an electronic control unit (ECU) 20 that controls the internal combustion engine 1. The ECU 20 is a microcomputer that has a known structure in which read only memory (ROM), random access memory (RAM), a central processing unit (CPU), an input port, an output port, a digital-analog converter (DA converter), an analog-digital converter (AD converter), etc. are connected to each other via a bi-directional bus.

The ECU 20 executes various known basic controls for a diesel engine, such as the fuel injection control, based on the operation mode of the internal combustion engine 1 and an instruction from a driver. Therefore, the internal combustion engine 1 in the embodiment of the invention is provided with an exhaust gas A/F sensor 11 that is provided between the turbine housing 5b and the exhaust gas control apparatus 10 and that detects the air-fuel ratio in the exhaust gas; a crank position sensor 16 that detects the rotational phase (crank angle) of a crankshaft (not shown) of the internal combustion engine 1; an accelerator angle sensor 15 that detects the amount by which an accelerator pedal 14 is depressed by the driver (accelerator angle); an airflow meter 7 that detects the flow rate of the newly-taken air flowing through the intake pipe 3; and various sensors (not shown) that are usually provided to a diesel engine.

These sensors are connected to the ECU 20 via electric wiring, and signals output from these sensors are transmitted to the ECU 20. Devices such as drive units that drive the first intake throttle valve 6, the second intake throttle valve 9, the exhaust throttle valve 19, the low-pressure EGR valve 32, and the high-pressure EGR valve 42 are connected to the ECU 20 via electric wiring. These devices are controlled according to control signals transmitted from the ECU 20.

The ECU 20 determines the operation mode of the internal combustion engine 1 and the instruction from the driver based on the values detected by these sensors. For example, the ECU 20 detects the operation mode of the internal combustion engine 1 based on the engine speed, which is determined based on the crank angle indicated by a signal from the crank position sensor 16, and the engine load, which is determined based on the accelerator angle indicated by a signal from the accelerator angle sensor 15. Then, the ECU 20 controls the low-pressure EGR valve 32, the high-pressure EGR valve 42, etc. based on the detected engine operation mode and an instruction from the driver, thereby controlling the EGR gas amount, the intake air amount, etc.

Next, the EGR control executed by the ECU 20 will be described.

In the exhaust gas recirculation system according to the embodiment of the invention, a specified value of the low-pressure EGR gas amount (hereinafter, referred to as a "reference low-pressure EGR gas amount"), a specified value of the high-pressure EGR gas amount (hereinafter, referred to as a "reference high-pressure EGR gas amount") are determined in advance for each operation mode of the internal combustion engine 1, and stored in ROM of the ECU 20. When the low-pressure EGR gas amount and the high-pressure EGR gas amount are at the specified values, the engine characteristics such as the exhaust gas properties, for example, the NOx discharge amount, the specific fuel consumption related to performance of EGR, and the intake air amount satisfy the requirements.

Then, the low-pressure EGR valve opening amount, at which the low-pressure EGR gas amount matches the reference low-pressure EGR gas amount when the internal combustion engine 1 performs the steady operation, is determined and used as the reference low-pressure EGR valve opening amount. The high-pressure EGR valve opening amount, at which the high-pressure EGR gas amount matches the reference high-pressure EGR gas amount when the internal combustion engine 1 performs the steady operation, is determined and used as the reference high-pressure EGR valve opening amount. The reference low-pressure EGR valve opening amount and the reference high-pressure EGR valve opening amount are stored in the ROM of the ECU 20.

The ECU 20 reads the reference low-pressure EGR valve opening amount and the reference high-pressure EGR valve opening amount from the ROM based on the operation mode of the internal combustion engine 1. The ECU 20 controls the low-pressure EGR valve 32 so that the low-pressure EGR valve opening amount matches the reference low-pressure EGR valve opening amount. The ECU 20 also controls the high-pressure EGR valve 42 so that the high-pressure EGR valve opening amount matches the reference high-pressure EGR valve opening amount.

During the steady operation of the internal combustion engine 1, the high-pressure EGR valve opening amount is controlled in a feedback manner, and the low-pressure EGR valve opening amount is controlled to the reference low-pressure EGR valve opening amount in an open-loop manner. In this way, the specified amount of EGR gas is recirculated back to the internal combustion engine 1. However, in the transitional operation period in which the operation mode of the internal combustion engine changes with time, the amount of EGR gas recirculated back to the internal combustion engine 1 may deviate from the specified value because the amount of low-pressure EGR gas does not change promptly in response to the control over the low-pressure EGR valve opening amount. In this case, the intake air amount (consequently, the oxygen concentration in the cylinders) may be inappropriate with respect to the fuel injection amount, resulting in an increase in the amount of smoke.

In the transitional operation period in which the operation mode of the internal combustion engine is changing, the high-pressure EGR valve opening amount and the low-pressure EGR valve opening amount may be controlled in a feedback manner. However, in this case as well, the high-pressure EGR gas amount is appropriately controlled because it changes promptly in response to a change in the high-pressure EGR valve opening amount, whereas the low-pressure EGR gas amount does not change promptly in response to a change in the low-pressure EGR valve opening amount. Therefore, if the high-pressure EGR valve opening amount and the low-pressure EGR valve opening amount are controlled in a feedback manner at the same time, hunting occurs in the control over the intake air amount, resulting in an increase in the amount of smoke and deterioration in the drivability.

Therefore, with the exhaust gas recirculation system according to the embodiment of the invention, the following control is executed in the transitional operation period in which the operation mode of the internal combustion engine 1 is changing. In the early stage of the transitional operation period, first, the high-pressure EGR valve opening amount is controlled in a feedback manner, and the low-pressure EGR valve opening amount is controlled to the reference low-pressure EGR valve opening amount in an open-loop manner, whereby the intake air amount is controlled. Then, if the intake air amount has still not reached the target intake air amount at a time at which the high-pressure EGR valve 42 is fully closed, the feedback control over the low-pressure EGR valve opening amount is started. Then, at a time at which the intake air amount matches the target intake air amount, the feedback control over the high-pressure EGR valve opening amount and the open-loop control for controlling the low-pressure EGR valve opening amount to the reference low-pressure EGR valve opening amount are started.

The target intake air amount is a target value of the intake air amount, which is determined in advance. When the intake air amount matches the target intake air amount, the injected fuel is burned appropriately, and occurrence of incomplete combustion, for example, a misfire, and generation of smoke are minimized. The target intake air amount is determined in advance, and stored in the ROM of the ECU 20 in a form of a map corresponding to the operation mode of the internal combustion engine 1.

As described above, in the early stage of the transitional operation period, only the high-pressure EGR valve opening amount is controlled in a feedback manner. The high-pressure EGR gas amount changes promptly in response to a change in the high-pressure EGR valve opening amount. Accordingly, the intake air amount promptly approaches the target intake air amount. Also, the two parameters, namely, the high-pressure EGR valve opening amount and the low-pressure EGR valve opening amount are not controlled in a feedback manner at the same time. The high-pressure EGR gas amount changes promptly in response to a change in the high-pressure EGR valve opening amount, whereas the low-pressure EGR gas amount does not change promptly in response to a change in the low-pressure EGR valve opening amount. As a result, occurrence of hunting in the control over the intake air amount is suppressed.

Hereafter, the EGR control (the intake air amount control) according to the embodiment of the invention will be described in detail with reference to FIG. 2. FIG. 2 is a flowchart showing the routine of the EGR control according to the embodiment of the invention. The routine is executed by the ECU 20 at predetermined time intervals while the internal combustion engine 1 is operating.

In step S101, the ECU 20 detects the operation mode of the internal combustion engine 1. More specifically, the ECU 20 calculates the engine speed based on the crank angle detected by the crank position sensor 16, and calculates the engine load based on the accelerator angle detected by the accelerator angle sensor 15.

In step S102, the ECU 20 reads the target intake air amount based on the operation mode of the internal combustion engine 1 detected in step S101.

In step S103, the ECU 20 reads the reference high-pressure EGR valve opening amount and the reference low-pressure EGR valve opening amount based on the operation mode of the internal combustion engine 1 detected in step S101.

In step S104, the ECU 20 determines whether the internal combustion engine 1 is in the steady operation mode at the current moment based on the operation mode of the internal combustion engine 1 detected in step S101 and the history of the operation modes detected in the previous routines. If an affirmative determination is made in step S104, the ECU 20 executes step S110. If a negative determination is made in step S104, the ECU 20 executes step S105.

In step S105, the ECU 20 detects the amount of air actually taken in the internal combustion engine 1 (hereinafter, referred to as the "actual intake air amount"). More specifically, the ECU 20 calculates the actual intake air amount based on the value detected by the exhaust gas A/F sensor 11, the value detected by the airflow meter 7, and the actual fuel injection amount.

In step S106, the ECU 20 determines whether the actual intake air amount detected in step S105 matches the target intake air amount read in step S102. According to the embodiment of the invention, when the absolute value of the difference between the actual intake air amount and the target intake air amount is smaller than a predetermined value, the ECU 20 determines that the actual intake air amount matches the target intake air amount. If an affirmative determination is made in step S106, the ECU 20 executes step S110. On the other hand, if a negative determination is made in step S106, the ECU 20 executes step S107.

In step S107, the ECU 20 determines whether the high-pressure EGR valve 42 is fully closed. If an affirmative determination is made in step S107, the ECU 20 executes step S109. On the other hand, if a negative determination is made in step S107, the ECU 20 executes step S108.

In step S108, the ECU 20 controls the high-pressure EGR valve opening amount in a feedback manner, and controls the low-pressure EGR valve opening amount to the reference low-pressure EGR valve opening amount in an open-loop manner.

In step S109, the ECU 20 controls the high-pressure EGR valve opening amount in an open-loop manner, and controls the low-pressure EGR valve opening amount in a feedback manner.

After executing step S108 or step S109, the ECU 20 executes step S106 again. Then, if an affirmative determination is made in step S106, the ECU 20 executes a steady operation-time control in step S110. Namely, the ECU 20 controls the high-pressure EGR valve opening amount in a feedback manner, and controls the low-pressure EGR valve opening amount to the reference low-pressure EGR valve opening amount in an open-loop manner.

As in step S110, constantly controlling the high-pressure EGR valve in a feedback manner at normal times allows the intake air amount to change promptly in response to a change in the operation mode of the internal combustion engine 1, even when the internal combustion engine 1 is in the transitional operation mode almost all the time, for example, even when the vehicle is running in a city while alternately accelerating and stopping.

FIGS. 3A to 3G are time charts showing time-changes in the fuel injection amount, the high-pressure EGR valve opening amount, the high-pressure EGR gas amount, the low-pressure EGR valve opening amount, the low-pressure EGR gas amount, the intake air amount, and the amount of generated smoke, the time changes being caused when the routine described above is executed in the engine speed-up transitional operation period in which the operation mode of the internal combustion engine 1 is changing.

Figure 3A:
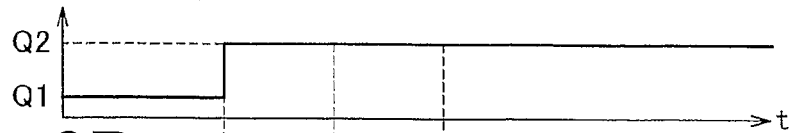
FIGS. 3A to 3G are time charts showing time-changes in the fuel injection amount, the opening amount of a high-pressure EGR valve, the high-pressure EGR gas amount, the opening amount of a low-pressure EGR valve, the low-pressure EGR gas amount, the intake air amount, and the amount of generated smoke, the time changes being caused when the EGR control according to the embodiment of the invention is executed.

As shown in FIG. 3A, at time t1 at which the operation mode of the internal combustion engine 1 is changed from the first operation mode to the second operation mode, in which a load higher than that in the first operation mode is applied to the internal combustion engine 1, the fuel injection amount is increased from the amount Q1 to the amount Q2 (>Q1). Then, the operation mode of the internal combustion engine 1 is brought into the engine speed-up transitional operation mode.

Figure 3B:
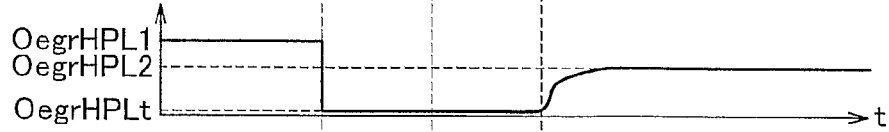
Figure 3C:
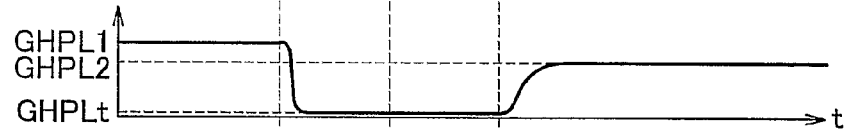
Figure 3D:
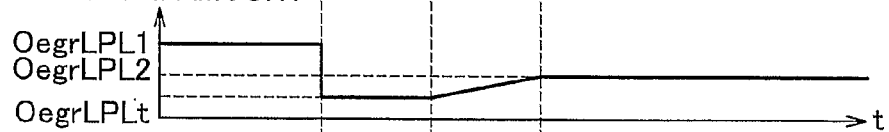
Figure 3E:
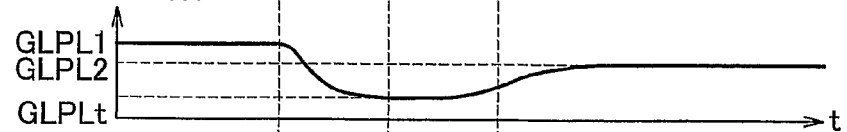
Figure 3F:
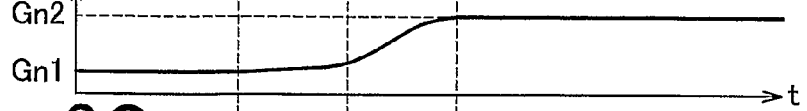

At this time, as shown in FIG. 3F, the actual intake air amount (Gn1) is significantly deviated from the target intake air amount Gn2 corresponding to the second operation mode. Accordingly, first, the feedback control over the high-pressure EGR valve opening amount is started.

Thus, as shown in FIG. 3B, at time t1, the high-pressure EGR valve opening amount is changed from the high-pressure EGR valve opening amount OegrHPL1, which is achieved immediately before the operation mode of the internal combustion engine 1 changes from the first operation mode to the second operation mode, to the transitional operation-time high-pressure EGR valve opening amount OegrHPLt. The transitional operation-time high-pressure EGR valve opening amount OegrHPLt is substantially equal to zero, namely, the high-pressure EGR valve 42 is substantially fully closed. This is because, the high-pressure EGR valve opening amount is abruptly decreased by the feedback control, because the difference between the actual intake air amount Gn1 at time t1 and the target intake air amount Gn2 corresponding to the second operation mode is large.

At this time, the low-pressure EGR valve opening amount is controlled to the reference low-pressure EGR valve opening amount OegrLPL2 corresponding to the second operation mode in an open-loop manner. As described above, the high-pressure EGR valve 42 is substantially fully closed immediately after time t1. Therefore, immediately after time t1, the feedback control over the low-pressure EGR valve opening amount is started.

Thus, as shown in FIG. 3D, the low-pressure EGR valve opening amount changes from the reference low-pressure EGR valve opening amount OegrLPL1 corresponding to the first operation mode to the transitional operation-time low-pressure EGR valve opening amount OegrLPLt immediately after time t1. Even at this time, the intake air amount has still not reached the target intake air amount Gn2. Accordingly, the transitional operation-time low-pressure EGR valve opening amount OegrLPLt is brought to an opening amount that is smaller than the reference low-pressure EGR valve opening amount OegrLPL2 corresponding to the second operation mode.

Thus, both the high-pressure EGR gas amount and the low-pressure EGR gas amount decrease, and the actual intake air amount gradually increases between time t2 and time t3 as shown in FIG. 3F. With an increase in the actual intake air amount, the difference between the actual intake air amount and the target intake air amount Gn2 is gradually decreased. Therefore, the low-pressure EGR valve opening amount during the feedback control is gradually increased, as shown in FIG. 3D.

Then, at time t3 at which the actual intake air amount matches the target intake air amount Gn2, the low-pressure EGR valve opening amount matches the reference low-pressure EGR valve opening amount OegrLPL2 corresponding to the second operation mode. At this time, the open-loop control over the low-pressure EGR valve opening amount is resumed, and the feedback control over the high-pressure EGR valve opening amount is started.

Thus, as shown in FIG. 3B, the high-pressure EGR valve opening amount is gradually increased from a value substantially equal to zero.

Figure 3G:
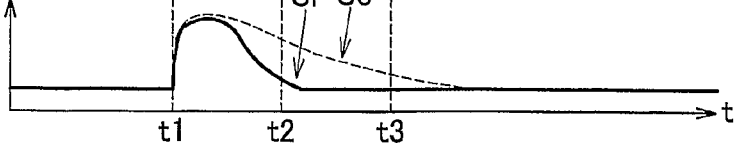

As shown by the solid line Si in FIG. 3G, the amount of smoke generated when the EGR control is executed in the above-described manner becomes smaller than the amount of smoke generated when the EGR control according to the embodiment of the invention is not executed.

According to the embodiment of the invention, the high-pressure EGR valve opening amount is controlled basically in a feedback manner during the steady operation of internal combustion engine 1. However, in FIGS. 3A to 3G, time-changes in various physical quantities caused by the feedback control over the high-pressure EGR valve opening amount before time t1 and after time t3 are not shown.

While the invention has been described with reference to an example embodiment thereof, it is to be understood that the invention is not limited to the example embodiment. To the contrary, the invention is intended to cover various modifications and equivalent arrangements within the scope of the invention. For example, the EGR control according to the embodiment of the invention is executed in the engine speed-up transitional operation period. However, a similar control may be executed in the engine speed-down transitional operation period. In this case as well, the EGR control is executed in the following manner. In the EGR control, in the early stage of the transitional operation period, the high-pressure EGR valve opening amount is controlled in a feedback manner and the low-pressure EGR valve opening amount is controlled in an open-loop manner. If the intake air amount has still not reached the target intake air amount even when the high-pressure EGR valve 42 is fully opened, the feedback control over the low-pressure EGR valve opening amount is started. Thus, it is possible to promptly bring the intake air amount to the target intake air amount without causing hunting even in the engine speed-down transitional operation period, thereby minimizing generation of smoke and deterioration in the drivability.

In the embodiment of the invention described above, the feedback control over the low-pressure EGR valve opening amount is started when the high-pressure EGR valve 42 is fully closed in the engine speed-up transitional operation period. However, the condition for shifting the control from the feedback control over the high-pressure EGR valve opening amount to the feedback control over the low-pressure EGR valve opening amount is not limited to this. For example, the control may be shifted from the feedback control over the high-pressure EGR valve opening amount to the feedback control over the low-pressure EGR valve opening amount, when the rate of decrease in the high-pressure EGR valve opening amount exceeds a predetermined upper limit value or when the high-pressure EGR valve opening amount is shifted to a value in a predetermined dead region. The predetermined dead region is a range of the high-pressure EGR valve opening amount, in which even when the high-pressure EGR valve opening amount is changed, the high-pressure EGR gas amount is unlikely to change by a desired amount. The predetermined dead region is determined in advance, for example, by experiments. The dead region may vary depending on, for example, the sizes of the engine components and the structure of the high-pressure EGR valve 42.

In the embodiment of the invention described above, the high-pressure EGR valve opening amount may be controlled in either a feedback manner or an open-loop manner during the feedback control over the low-pressure EGR valve. During the feedback control over the low-pressure EGR valve opening amount, the above-described condition has been satisfied. Accordingly, the high-pressure EGR valve opening amount is equal to or substantially equal to zero, or in the dead region. Therefore, even when the feedback control over the high-pressure EGR valve opening amount is executed, the possibility that hunting will occur is low.

The embodiment of the invention and the modified examples of the embodiment described above may be appropriately combined with each other.

The invention claimed is:

1. An exhaust gas recirculation system for an internal combustion engine, comprising:
    a turbocharger that includes a compressor arranged in an intake passage of the internal combustion engine, and a turbine arranged in an exhaust passage of the internal combustion engine;
    a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
    a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
    a high-pressure EGR valve that is provided in the high-pressure EGR passage, and that changes a flow passage area of the high-pressure EGR passage;
    a low-pressure EGR valve that is provided in the low-pressure EGR passage, and that changes a flow passage area of the low-pressure EGR passage; and
    an EGR control unit that controls an amount of exhaust gas recirculated back to the internal combustion engine by adjusting an opening amount of the high-pressure EGR valve to a reference high-pressure EGR valve opening amount determined in advance based on an operation mode of the internal combustion engine and adjusting an opening amount of the low-pressure EGR valve to a reference low-pressure EGR valve opening amount determined in advance based on the operation mode of the internal combustion engine during a steady operation of the internal combustion engine,
    wherein,
    in a transitional operation period in which the operation mode of the internal combustion engine is changing, the EGR control unit first controls the opening amount of the high-pressure EGR valve, and then controls the opening amount of the low-pressure EGR valve in a feedback manner after a predetermined condition is satisfied, so that an amount of air taken in the internal combustion engine matches a predetermined target intake air amount.

2. The exhaust gas recirculation system according to claim 1, wherein, in the transitional operation period, the EGR control unit first controls the opening amount of the high-pressure EGR valve in a feedback manner and the opening amount of the low-pressure EGR valve in an open-loop manner, and then controls the opening amount of the low-pressure EGR valve in a feedback manner after the predetermined condition is satisfied, so that the amount of air taken in the internal combustion engine matches the target intake air amount.

3. The exhaust gas recirculation system according to claim 2, wherein the opening amount of the low-pressure EGR valve is controlled in an open-loop manner and the opening amount of the high-pressure EGR valve is controlled in a feedback manner, after the amount of air taken in the internal combustion engine matches the target intake air amount while the opening amount of the low-pressure EGR valve is controlled in a feedback manner.

4. The exhaust gas recirculation system according to claim 1, wherein, in an engine speed-up transitional operation period in which the operation mode of the internal combustion engine is changing to an operation mode where a higher load is applied to the internal combustion engine, the EGR control unit first decreases the opening amount of the high-pressure EGR valve, and then decreases the opening amount of the low-pressure EGR valve after the predetermined condition is satisfied, so that the amount of air taken in the internal combustion engine matches the target intake air amount.

5. The exhaust gas recirculation system according to claim 4, wherein the predetermined condition is satisfied when the high-pressure EGR valve is fully closed and the amount of air taken in the internal combustion engine is smaller than the target intake air amount.

6. The exhaust gas recirculation system according to claim 4, wherein the predetermined condition is satisfied when a rate of decrease in the opening amount of high-pressure EGR valve exceeds a predetermined upper limit value.

7. The exhaust gas recirculation system according to claim 4, wherein the predetermined condition is satisfied when the opening amount of the high-pressure EGR valve is a value within a predetermined dead region in which an amount of exhaust gas, which is recirculated back to the internal combustion engine by the high-pressure EGR unit, is unlikely to change by a desired amount in response to a change in the opening amount of the high-pressure EGR valve and the amount of air taken in the internal combustion engine is smaller than the target intake air amount.

8. A method for controlling an exhaust gas recirculation system for an internal combustion engine, the exhaust gas recirculation system including:
    a turbocharger that includes a compressor arranged in an intake passage of the internal combustion engine, and a turbine arranged in an exhaust passage of the internal combustion engine;
    a high-pressure EGR unit that recirculates a portion of exhaust gas back to the internal combustion engine through a high-pressure EGR passage that provides communication between the exhaust passage, at a portion upstream of the turbine, and the intake passage, at a portion downstream of the compressor;
    a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;

a high-pressure EGR valve that is provided in the high-pressure EGR passage, and that changes a flow passage area of the high-pressure EGR passage; and a low-pressure EGR valve that is provided in the low-pressure EGR passage, and that changes a flow passage area of the low-pressure EGR passage, the method comprising:

controlling an amount of exhaust gas, which is recirculated back to the internal combustion engine, by adjusting an opening amount of the high-pressure EGR valve to a reference high-pressure EGR valve opening amount determined in advance based on an operation mode of the internal combustion engine and adjusting an opening amount of the low-pressure EGR valve to a reference low-pressure EGR valve opening amount determined in advance based on the operation mode of the internal combustion engine during a steady operation of the internal combustion engine; and first controlling the opening amount of the high-pressure EGR valve, and then controlling the opening amount of the low-pressure EGR valve in a feedback manner after a predetermined condition is satisfied, so that an amount of air taken in the internal combustion engine matches a predetermined target intake air amount in a transitional operation period in which the operation mode of the internal combustion engine is changing.

9. The method according to claim 8, wherein, in the transitional operation period, first, the opening amount of the high-pressure EGR valve is controlled in a feedback manner and the opening amount of the low-pressure EGR valve is controlled in an open-loop manner, and, then, the opening amount of the low-pressure EGR valve is controlled in a feedback manner after the predetermined condition is satisfied, so that the amount of air taken in the internal combustion engine matches the target intake air amount.

10. The method according to claim 9, wherein the opening amount of the low-pressure EGR valve is controlled in an open-loop manner and the opening amount of the high-pressure EGR valve is controlled in a feedback manner, after the amount of air taken in the internal combustion engine matches the target intake air amount while the opening amount of the low-pressure EGR valve is controlled in a feedback manner.

11. The method according to claim 8, wherein, in an engine speed-up transitional operation period in which the operation mode of the internal combustion engine is changing to an operation mode where a higher load is applied to the internal combustion engine, first, the opening amount of the high-pressure EGR valve is decreased, and, then, the opening amount of the low-pressure EGR valve is decreased after the predetermined condition is satisfied, so that the amount of air taken in the internal combustion engine matches the target intake air amount.

12. The method according to claim 11, wherein the predetermined condition is satisfied when the high-pressure EGR valve is fully closed and the amount of air taken in the internal combustion engine is smaller than the target intake air amount.

13. The method according to claim 11, wherein the predetermined condition is satisfied when a rate of decrease in the opening amount of high-pressure EGR valve exceeds a predetermined upper limit value.

14. The method according to claim 11, wherein the predetermined condition is satisfied when the opening amount of the high-pressure EGR valve is a value within a predetermined dead region in which an amount of exhaust gas, which is recirculated back to the internal combustion engine by the high-pressure EGR unit, is unlikely to change by a desired amount in response to a change in the opening amount of the high-pressure EGR valve and the amount of air taken in the internal combustion engine is smaller than the target intake air amount.

* * * * *